(12) United States Patent
Park et al.

(10) Patent No.: US 9,461,384 B2
(45) Date of Patent: Oct. 4, 2016

(54) CONNECTION MODULE AND MOBILE TERMINAL HAVING THE SAME

(71) Applicant: LG ELECTRONICS INC., Seoul (KR)

(72) Inventors: Jinyong Park, Seoul (KR); Chiyoung Kim, Seoul (KR); Kiyoung Kim, Seoul (KR); Dongho Lee, Seoul (KR); Kiho Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 18 days.

(21) Appl. No.: 14/208,455

(22) Filed: Mar. 13, 2014

(65) Prior Publication Data

US 2014/0302705 A1 Oct. 9, 2014

(30) Foreign Application Priority Data

Mar. 15, 2013 (KR) .................. 10-2013-0028230

(51) Int. Cl.
*H01H 13/02* (2006.01)
*H01R 12/71* (2011.01)
*H01H 13/705* (2006.01)
*H04M 1/23* (2006.01)
*H01R 13/24* (2006.01)

(52) U.S. Cl.
CPC .......... *H01R 12/714* (2013.01); *H01H 13/705* (2013.01); *H04M 1/236* (2013.01); *H01H 2207/032* (2013.01); *H01H 2223/014* (2013.01); *H01H 2225/028* (2013.01); *H01R 13/2428* (2013.01)

(58) Field of Classification Search
CPC .. H01H 1/403; H01H 1/5805; H01H 19/585; H01H 13/70; H01H 13/705
USPC .......................... 200/292, 341, 296, 516–517
See application file for complete search history.

(56) References Cited

U.S. PATENT DOCUMENTS

| 6,100,484 | A  | * | 8/2000  | Houze .................... H01H 13/70 200/284 |
| 6,752,662 | B2 | * | 6/2004  | Okamoto ............. H05K 3/3405 439/541.5 |
| 7,576,291 | B2 | * | 8/2009  | Tseng ..................... H01H 13/86 200/296 |
| 8,030,584 | B2 | * | 10/2011 | Lee .......................... H01H 1/26 200/292 |
| 8,932,069 | B2 | * | 1/2015  | Kim ....................... H01R 13/73 439/79 |
| 9,053,878 | B2 | * | 6/2015  | Kim ................... H01H 13/7006 |

* cited by examiner

*Primary Examiner* — Xuong Chung Trans
(74) *Attorney, Agent, or Firm* — KED & Associates LLP

(57) ABSTRACT

A connecting module includes: a body with conductive contact points formed on one surface; and a connecting terminal that is formed to be exposed to the other surface of the body and electrically connected to the conductive contact points, the connecting terminal including: a deformation portion that is elastically deformed in a direction toward or away from the body; and first and second support portions that are respectively formed on both sides of the deformation portion to support the deformation portion and integrally attached to the body.

14 Claims, 19 Drawing Sheets

CONNECTION MODULE AND MOBILE TERMINAL HAVING THE SAME

CROSS-REFERENCE TO RELATED APPLICATION(S)

Pursuant to 35 U.S.C. §119(a), this application claims the benefit of earlier filing date and right of priority to Korean Application No. 10-2013-0028230, filed on Mar. 15, 2013, the contents of which is incorporated by reference herein in its entirety.

BACKGROUND

1. Field

The present disclosure relates to a connection module that is mounted on a terminal and electrically connects structures adjacent to one another and a mobile terminal having the same.

2. Background

As a mobile terminal becomes multifunctional, the mobile terminal can be allowed to capture still images or moving images, play music or video files, play games, receive broadcast, etc., so as to be implemented as an integrated multimedia player.

Terminals can be divided into mobile/portable terminals and stationary terminals according to their mobility. The mobile terminal is a portable device that can be carried anywhere and have one or more of a function of performing voice and video calls, a function of inputting/outputting information, a function of storing data, etc.

In order to support and enhance such functions of the terminal, it can be considered to improve the configuration and/or software of the terminal.

Particularly, connection modules are modules that electrically connect an external device to structures within a terminal. Examples of the connection modules may include an earjack for connecting an external sound output device, such as an earphone, to equipment inside a terminal, a socket for electrically connecting an external interface to internal equipment, or a power key.

A connection module has to be of a predetermined size to be fixed to a terminal and requires a separate fixation structure, which is a limitation in the design of the terminal. Moreover, due to the connection structure between the connection module for transmitting signals and the interior of the terminal, the terminal is required to have a space, which goes against the miniaturization of terminals. In addition, when mounting the connection module to the terminal, an increase in the number of assembly processes may lower the productivity of the terminal. Accordingly, a connection module having a new structure may be taken into consideration.

SUMMARY OF THE INVENTION

Therefore, an aspect of the detailed description is to provide a connection module of a mobile terminal which has a different structure from conventional ones.

Another aspect of the detailed description is to provide a connection module which has an enhanced connection structure and becomes smaller.

To achieve these and other advantages and in accordance with the purpose of this specification, as embodied and broadly described herein, there is provided a connecting module according to an embodiment of the present invention, the connecting module including: a body with conductive contact points formed on one surface; and a connecting terminal that is formed to be exposed to the other surface of the body and electrically connected to the conductive contact points, the connecting terminal including: a deformation portion that is elastically deformed in a direction toward or away from the body; and first and second support portions that are respectively formed on both sides of the deformation portion to support the deformation portion and integrally attached to the body.

According to an embodiment related to the present invention, the deformation portion may extend from the first support portion to the second support portion to have a predetermined curvature.

According to an embodiment related to the present invention, the body may include a board that is electrically connected to the conductive contact points.

According to an embodiment related to the present invention, the connecting terminal may be electrically connected to the board.

According to an embodiment related to the present invention, the first and second support portions may be attached to the board so as to cover both sides in the thickness direction of the board.

According to an embodiment related to the present invention, the connecting terminal may be fixed to the board by soldering.

To achieve these and other advantages and in accordance with the purpose of this specification, as embodied and broadly described herein, there is provided a mobile terminal according to another embodiment of the present invention, the mobile terminal including: a terminal body; and a key module mounted on the terminal body, the key module including: a key body; a dome portion that generates a signal by pressing the key body; and a connecting terminal that is attached to the dome portion, the connecting terminal including: a deformation portion that is elastically deformed in a direction toward or away from the body; and first and second support portions that are respectively formed on both sides of the deformation portion to support the deformation portion and integrally attached to the body.

According to an embodiment related to the present invention, the dome portion may include attaching portions that extend in the length direction of the terminal body; and the attaching portions may be inserted into grooves formed in the terminal body.

According to an embodiment related to the present invention, the connecting terminal may be in contact with a contact portion of the circuit board facing the connecting terminal so as to transmit a signal to the circuit board embedded in the terminal body.

According to an embodiment related to the present invention, the connecting terminal may be a conductive terminal that is elastically deformable when in contact with the contact portion.

According to an embodiment related to the present invention, the contact portion may be formed in an accommodating portion that supports the dome portion on the side of the terminal body.

According to an embodiment related to the present invention, the contact portion may be formed on one side surface of the circuit board.

According to an embodiment related to the present invention, the contact portion may be attached to the circuit board.

According to an embodiment related to the present invention, the circuit board may further include a recessed portion that is recessed inward from one side surface, and the dome portion may be inserted into the recessed portion.

According to an embodiment related to the present invention, the dome portion may be attached to the circuit board by fastening means that penetrates through the circuit board and the dome portion.

According to an embodiment related to the present invention, the dome portion may include an inwardly recessed insert portion, and the circuit board may be inserted into the insert portion.

According to an embodiment related to the present invention, the deformation portion may extend from the first support portion to the second support portion to have a predetermined curvature.

According to an embodiment related to the present invention, an actuator may be formed on the rear surface of the key body to press the dome.

According to an embodiment related to the present invention, the key body may include: a manipulating portion that forms the outer appearance of the key body; a pressure portion that is attached to the manipulating portion, has an actuator formed on the rear surface, and is formed integrally with the dome portion; and a support portion that supports the pressure portion.

According to an embodiment related to the present invention, the dome portion may further include a separation member that protrudes toward the pressure portion from one surface of the dome portion so as to separate the dome from the actuator by a predetermined gap.

BRIEF DESCRIPTION OF THE DRAWINGS

The embodiments will be described in detail with reference to the following drawings in which like reference numerals refer to like elements wherein:

FIGS. 6b and 6c are a rear perspective view and an exploded perspective view, respectively, of the key module shown in FIG. 6a;

DETAILED DESCRIPTION

Description will now be given in detail of the exemplary embodiments, with reference to the accompanying drawings. For the sake of brief description with reference to the drawings, the same or equivalent components will be provided with the same reference numbers, and description thereof will not be repeated. Singular expressions include plural expressions which do not have any obviously different meaning in view of a context.

A mobile terminal according to the present invention may include a portable phone, a smart phone, a laptop computer, a digital broadcasting terminal, Personal Digital Assistants (PDA), Portable Multimedia Player (PMP), a navigation system, etc. However, it will be obvious to those skilled in the art that the present invention may be also applicable to a fixed terminal such as a digital TV and a desktop computer.

Figure 1:
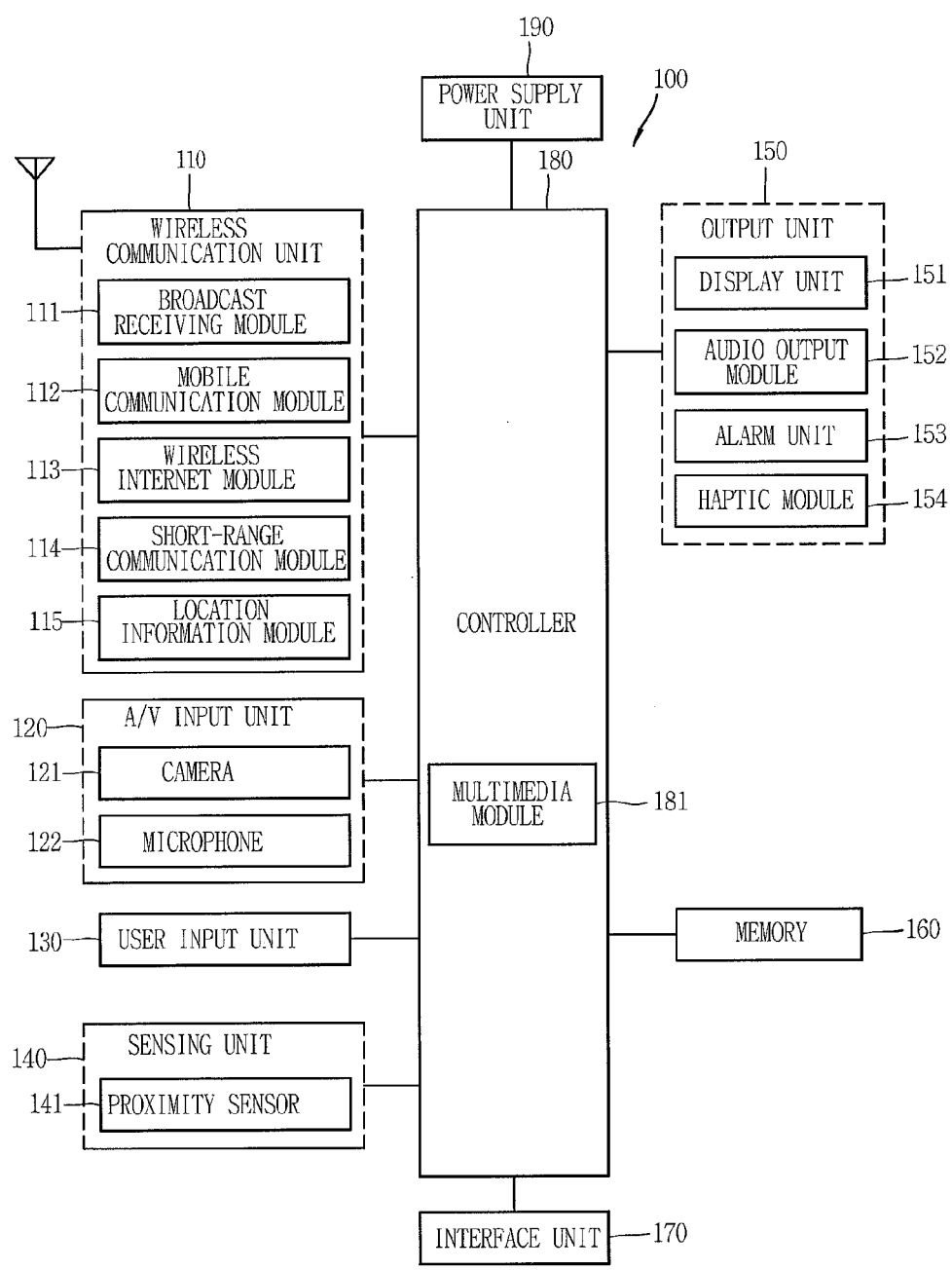
FIG. 1 is a block diagram of a mobile terminal according to an example of the present invention.

FIG. 1 is a block diagram of a mobile terminal 100 according to an embodiment of the present invention.

The mobile terminal 100 may comprise components, such as a wireless communication unit 110, an Audio/Video (A/V) input unit 120, a user input unit 130, a sensing unit 140, an output module 150, a memory 160, an interface unit 170, a controller 180, a power supply unit 190, and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a location information module 115 and the like.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcasting signals and/or broadcasting associated information received through the broadcast receiving module 111 may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The location information module 115 denotes a module for sensing or calculating a position of a mobile terminal. An example of the location information module 115 may include a Global Position System (GPS) module.

Referring to FIG. 1, the A/V input unit 120 is configured to receive an audio or video signal. The A/V input unit 120 may include a camera 121, a microphone 122 or the like. The camera 121 processes image frames such as still images or moving images acquired by an image sensor in a video call mode or an image capturing mode. The processed image frames may be displayed on a display unit 151.

The image frames processed by the camera 121 may be stored in the memory 160 or transmitted to the outside via the wireless communication unit 110. Two or more cameras 121 may be provided according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated while receiving and transmitting audio signals.

The user input unit 130 may generate input data for allowing a user to control various operations of the mobile communication terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is open or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner. The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, or a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of these displays may be configured to be transparent so that outside may be seen therethrough, which may be referred to as a transparent display. A representative example of the transparent display may include a Transparent Organic Light Emitting Diode (TOLED), and the like. The rear surface portion of the display unit 151 may also be implemented to be optically transparent. Under this configuration, a user can view an object positioned at a rear side of a body through a region occupied by the display unit 151 of the body.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the mobile terminal blocked by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, capacitance type proximity sensor, a magnetic type proximity sensor, an infrared rays proximity sensor, and so on. When the touch screen is implemented as capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, and so on.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. The video signal or the audio signal may be output via the display unit 151 or the audio output module 152. Accordingly, the display unit 151 or the audio output module 152 may be classified as part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2:
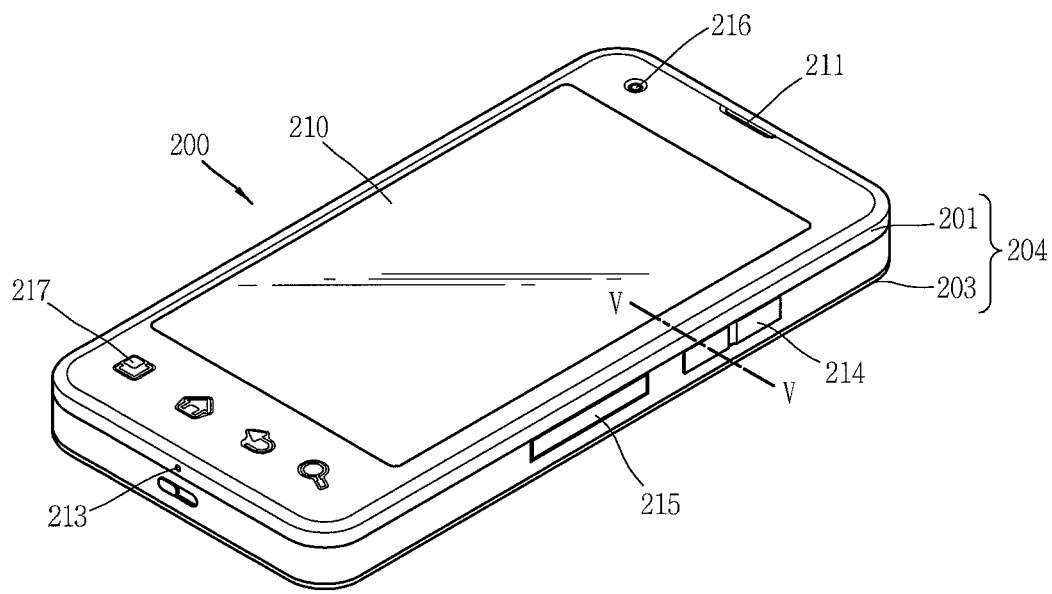
FIG. 2 is a front perspective view of a mobile terminal according to an embodiment of the present invention.
Figure 3:
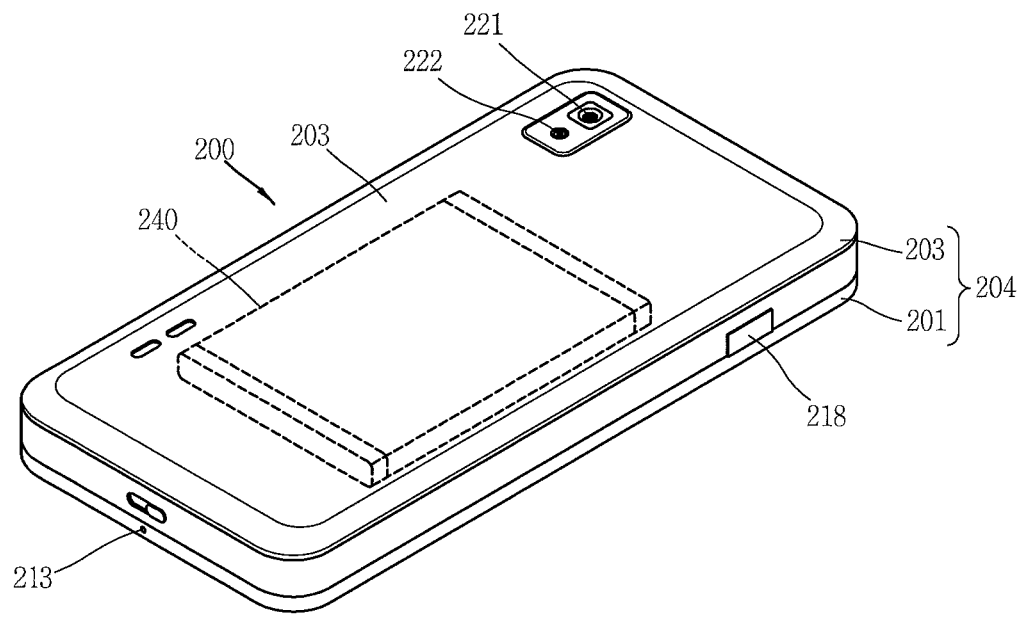
FIG. 3 is a rear perspective view of the mobile terminal.

FIG. 2 is a front perspective view of a mobile terminal according to the present invention, and FIG. 3 is a rear perspective view of the mobile terminal of FIG. 2.

Referring to FIGS. 2 and 3, the mobile terminal 200 according to the present invention is provided with a bar type terminal body. However, the present invention is not limited to this, but may be applied to a slide type in which two or more bodies are coupled to each other so as to perform a relative motion, a folder type, a swing type, and the like. Further, the mobile terminal of the present invention may be applied to any portable electronic device having a camera and a flash, for instance, a portable phone, a smart phone, a notebook computer, a digital broadcasting terminal, Personal Digital Assistants (PDAs), Portable Multimedia Players (PMO), etc.

The mobile terminal 200 includes a terminal body 204 which forms the appearance thereof. A case (casing, housing, cover, etc.) which forms the appearance of the terminal body 204 may include a front case 201, a rear case 202, and a battery cover 203 for covering the rear surface of the rear case 202.

A space formed by the front case 201 and the rear case 202 may accommodate various components therein. Such cases may be formed by injection-molded synthetic resin, or may be formed using a metallic material such as stainless steel (STS) or titanium (Ti).

On the front surface of the terminal body 204, may be disposed a display unit 210, a first audio output unit 211, a front camera 216, a side key 214, an interface unit 215, and a signal input unit 217.

The display unit 210 includes a liquid crystal display (LCD) module, organic light emitting diodes (OLED) module, e-paper, etc., each for visually displaying information. The display unit 210 may include a touch sensing means for inputting information in a touch manner.

The display unit 210 includes a window 210a (refer to FIG. 8) and a display module 210b. Hereinafter, the window 210a including a touch sensing means is called 'touch screen'. Once part on the touch screen 210a is touched, content corresponding to the touched position is input. The content input in a touch manner, may be characters, or numbers, or menu items which can be set in each mode. The touch sensing means may be transmissive so that the display can be viewed, and may include a structure for enhancing visibility of the touch screen at a bright place. Referring to FIG. 2, the touch screen 210a occupies most of the front surface of the front case 201.

The first audio output unit 211 may be implemented as a receiver for transmitting a call sound to a user's ear, or a loud speaker for outputting each type of alarm sound or a playback sound of multimedia.

The front camera 216 processes image frames such as still images or moving images, acquired by an image sensor in a video call mode or a capturing mode. The processed image frames may be displayed on the display unit 210.

The image frames processed by the front camera 216 may be stored in the memory 160, or may be transmitted to the outside through the wireless communication unit 110. The front camera 216 may be implemented in two or more according to a user's interface.

The user input unit 217 is manipulated to receive a command for controlling the operation of the mobile terminal 200, and may include a plurality of input keys. The input keys may be referred to as manipulation portions, and may include any type of ones that can be manipulated in a user's tactile manner.

For instance, the user input unit 217 may be implemented as a dome switch, or a touch screen, or a touch pad for inputting commands or information in a user's push or touch manner. Alternatively, the user input unit 217 may be implemented, for example, as a wheel for rotating a key, a jog, or a joystick. The user input unit 217 is configured to input various commands such as START, END and SCROLL.

A side key 214, an interface unit 215, an audio input unit 213, etc. are disposed on the side surface of the front case 201.

The side key 214 may be called 'manipulation unit', and may be configured to receive commands for controlling the operation of the mobile terminal 200. The side key 214 may include any type of ones that can be manipulated in a user's tactile manner. Content input by the side key 214 may be variously set. For instance, through the side key 214, may be input commands such as controlling the front camera 216 and a rear camera 221, controlling the level of sound output from the audio output unit 211, and converting a current mode of the display unit 210 into a touch recognition mode.

The audio output unit 213 may be implemented as a microphone for receiving a user's voice, other sound, etc.

The interface unit 215 serves as a path through which the mobile terminal 200 performs data exchange, etc. with an external device. For example, the interface unit 215 may be at least one of a connection terminal through which the mobile terminal 200 is connected to an ear phone by cable or radio, a port for local area communication, e.g., an infrared data association (IrDA) port, a Bluetooth portion, a wireless LAN port, and power supply terminals for supplying power to the mobile terminal 200. The interface unit 215 may be a card socket for accommodating an external card such as a subscriber identification module (SIM) card, a user identity module (UIM) card or a memory card for storing information.

A power supply unit 240 and the rear camera 221 are disposed on the rear surface of the body 204.

A flash 222 and a mirror (not shown) may be disposed close to the rear camera 221. When capturing an object by using the rear camera 221, the flash 222 provides light onto the object.

When the user captures an image of himself/herself by using the rear camera 221, the mirror can be used for the user to look at himself/herself therein.

The rear camera 221 may face a direction which is opposite to a direction faced by the front camera 216, and may have different pixels from those of the front camera 216.

For example, the front camera 216 may operate with relatively lower pixels (lower resolution). Thus, the front camera 216 may be useful when a user can capture his face and send it to another party during a video call or the like. On the other hand, the rear camera 221 may operate with a relatively higher pixels (higher resolution) such that it can be useful for a user to obtain higher quality pictures for later use. The front camera 216 and the rear camera 221 may be installed at the terminal body 204 so as to rotate or pop-up.

The power supply unit 240 is configured to supply power to the mobile terminal 200. The power supply unit 240 may be mounted in the terminal body 204, or may be detachably mounted to the terminal body 204.

Figure 4:
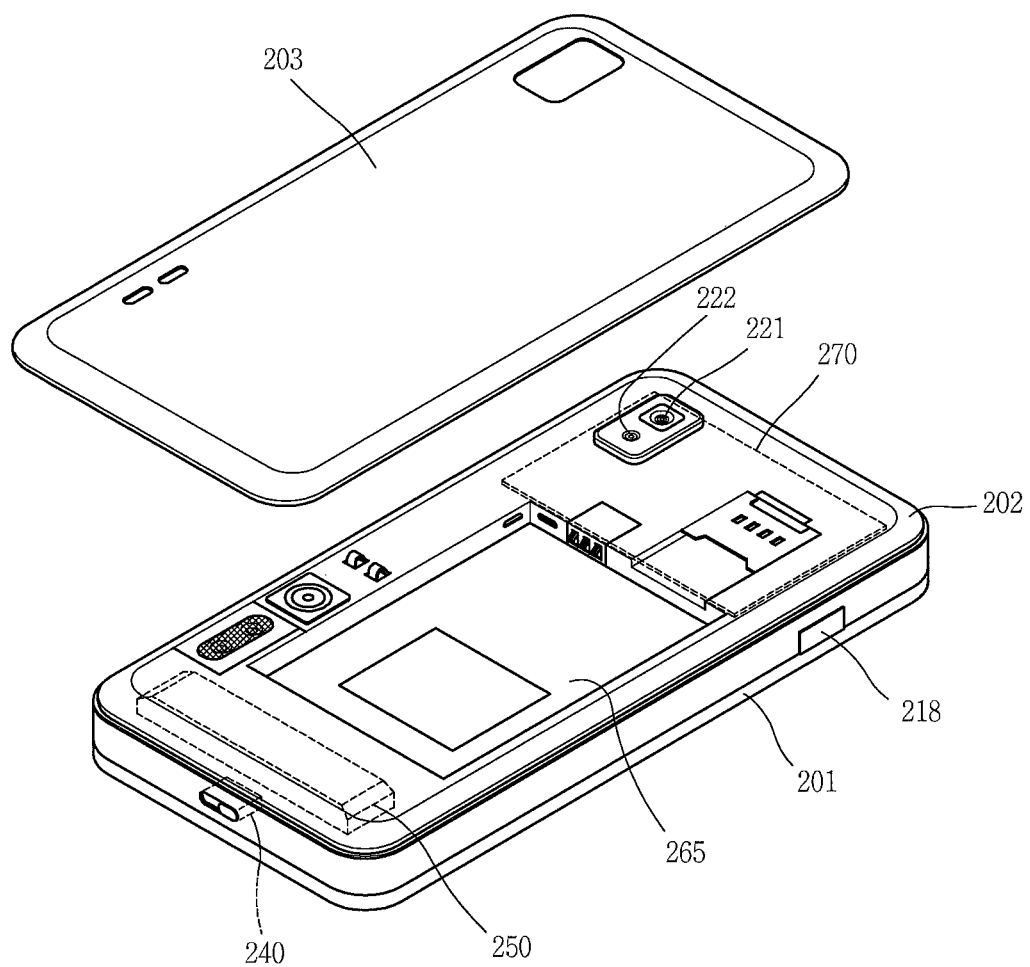
FIG. 4 is a perspective view of the mobile terminal of FIG. 3 from which a battery case is removed.
Figure 5:
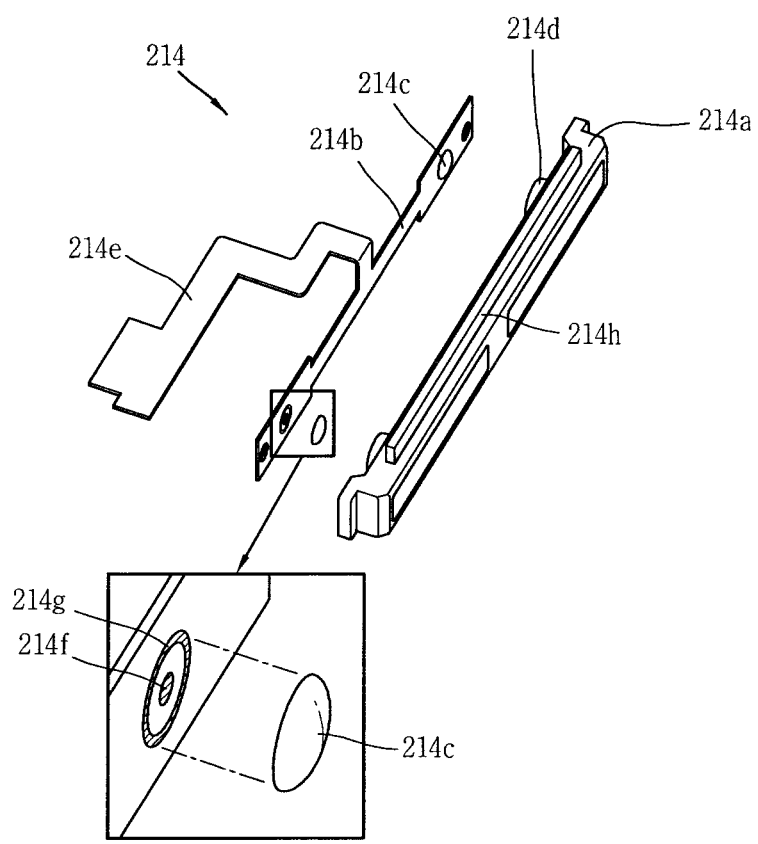
FIG. 5 is a view illustrating a key module according to a comparative example.

FIG. 4 is a perspective view of the mobile terminal of FIG. 3 from which a battery case is removed. FIG. 5 is a conceptual diagram of a frame according to an embodiment of the present invention. FIG. 6 is a conceptual diagram of the frame to which a signal input module is attached.

Referring to FIG. 4, a circuit board 270 is arranged in an inner space of a terminal body 204 including a front case 201 and a rear case 202. The circuit board 270 may be mounted on the rear case 202, as shown in the drawing, or mounted on a separate internal structure. The circuit board 270 may be configured as an exemplary controller for operating a variety of functions of the mobile terminal.

An antenna device 250 for emitting radio signals may be arranged in the inner space of the terminal body 204.

A socket 240, which is electrically connected to the circuit board 270 and allows access to external devices is arranged in the inner space of the terminal body 204.

An example of the external devices to be inserted into the socket 240 may include a SIM card. A SIM card (Scriber Identify Module card) refers to a card capable of storing personal information. Besides, memory cards like T-Flash cards, which are commonly referred to as micro-SD cards, and chips for modems like MSM chips (Mobile Station Modem chips) may be inserted.

Also, other external devices, including interface devices for charging, such as an Multimedia Interface Connector (MMI Connector), for calling, such as an earphone, and for data cable ports, may be inserted into the socket 240.

Figure 6A:
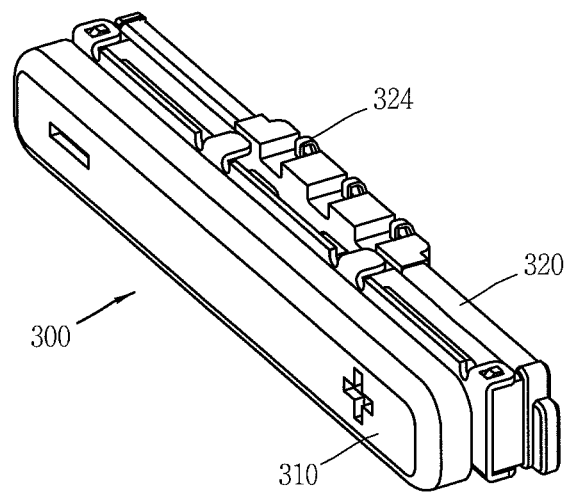
FIG. 6a is a conceptual diagram illustrating a key module according to an embodiment of the present invention.
Figure 6B:
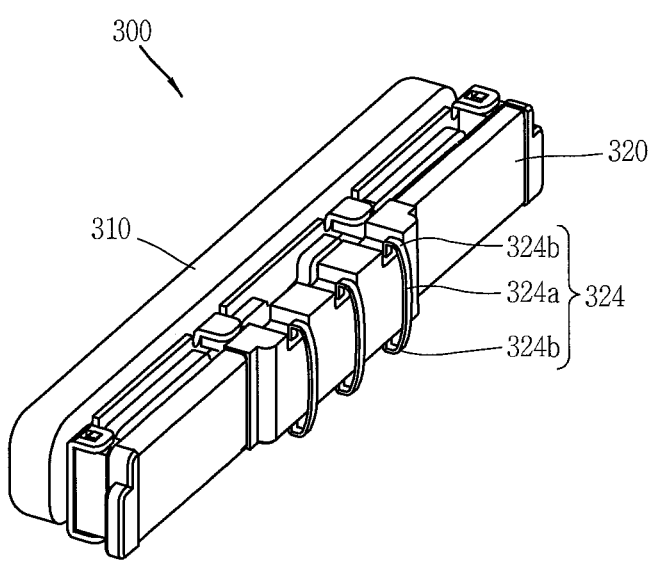
Figure 6C:
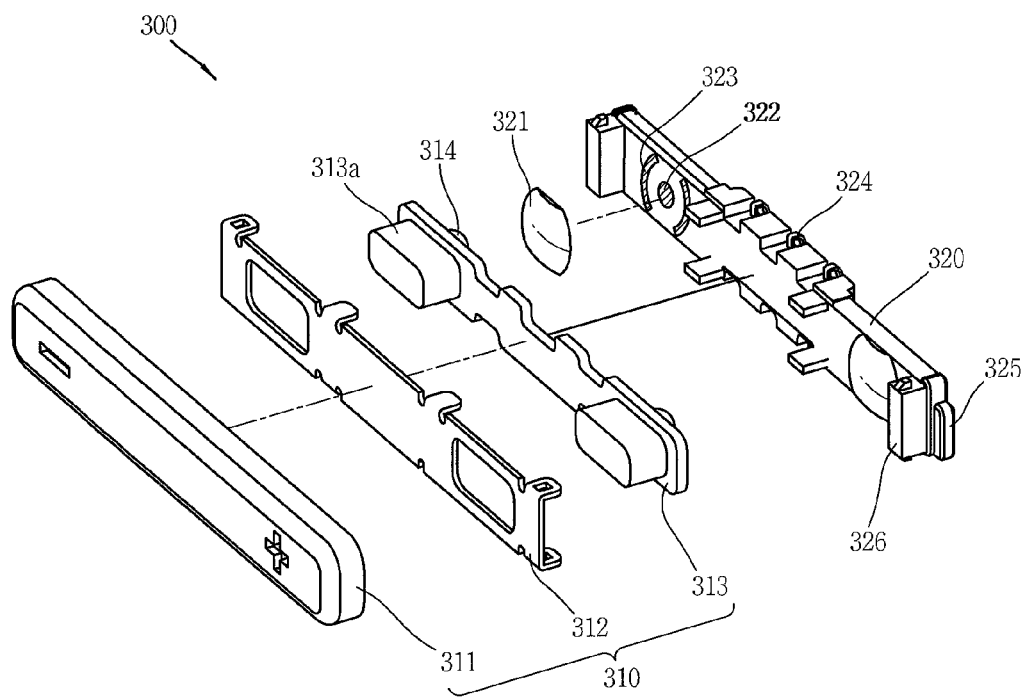

FIG. 5 is a view illustrating a key module according to a comparative example. FIG. 6a is a conceptual diagram illustrating a key module according to an embodiment of the present invention, and FIGS. 6b and 6c are a rear perspective view and an exploded perspective view, respectively, of the key module shown in FIG. 6a.

Referring to FIG. 5, the key module 214 according to the comparative example includes a key body 214a and a dome portion 214b. An actuator 214d is formed on the rear surface of the key body 214a, and the actuator 214d presses a dome 214c of the dome portion 214b facing it by a user's pressing action. The pressed dome 214c is elastically deformed by the actuator 214d and electrically connects two contact points 214g and 214f formed on one surface of the deformed dome portion 214b, thereby issuing a signal.

The dome portion 214b is connected to a flexible circuit board 214e, and the flexible circuit board 214e is connected all the way to the circuit board embedded in the terminal body. That is, one end of the flexible circuit board 214e is connected to the dome portion 214b, and the other end is connected to the circuit board. Due to this, the signal generated by the user's pressing the key body 214a is transmitted to the circuit board through the dome portion 214b and the flexible circuit board 214e.

To configure the key module 214 in this way, an assembly process is required to connect the flexible circuit board 214e connected to the dome portion 214b to the circuit board mounted within the main body. Also, separate connecting means is required to connect the ends of the flexible circuit board 214e to the key module 214 and the circuit board, respectively. Moreover, a space is required because the flexible circuit board 214e has to be installed within the terminal, avoiding interference with other parts. The space occupied by the flexible circuit board 214e becomes a factor that makes it difficult to optimize the arrangement of parts in the terminal. In addition, an additional process for assembling the flexible circuit board 214e to the mobile terminal becomes a factor that reduces efficiency in the manufacture of terminals.

The key module 300 according to the present invention presents more efficient means of connecting to the circuit board 270. Due to this, the assembly process can be simplified, and the key module 300 can be mounted on the terminal body 204 within narrower space.

Referring to FIGS. 6a to 6c, the key module 300 according to the present invention uses a connecting terminal 324 to connect to the circuit board 270. As the connecting terminal 324 is provided on the key module 300, such a structure as the flexible circuit board can be omitted, which can simplify the assembly process.

Figure 7A:
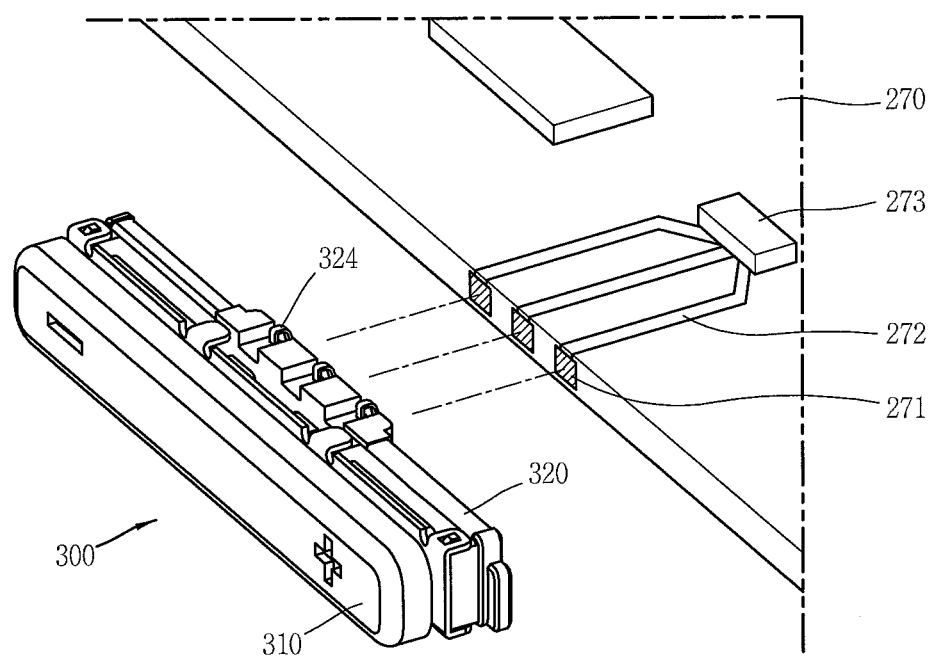
FIG. 7a illustrates an example where the key module of FIG. 6a is connected to the circuit board.

In this case, a contact portion 271 (see FIG. 7a) may be formed between the connecting terminal 324 and the circuit board 270 (see FIG. 7a). Also, the contact portion 271 and the circuit board 270 are electrically connected.

The connecting terminal 324 is elastically deformed when in contact with the contact portion 271. That is, the connecting terminal 324, an elastically deformable conductive terminal, comes into elastic contact with the contact portion 271. Due to this, the connecting terminal 324 can maintain contact with the contact portion 271 while performing a buffering action against the impact on the terminal.

Referring to FIG. 6b, the upper and lower parts of the connecting terminal 324 are symmetrical with respect to the center. The connecting terminal 324 may include a deformation portion 324a and first and second support portions 324b. The deformation portion 324a may be elastically deformed in a direction toward or away from the dome portion 320. Therefore, the deformation portion 324a and the contact portion may maintain elastic contact with each other. The first and second support portions 324b may be formed on both sides of the deformation portion 324a. The first and second support portions 324b may elastically support the deformation portion 324a. According to an embodiment, at least one of the first and second support portions 324b may be inserted and fixed into the dome portion 320.

In an example, the first and second support portions 324b may be inserted and fixed into the dome portion 320. Also, any one of the support portions 324b may be electrically connected to conductive contact points 322 and 323 formed on the dome portion 320, by which signals generated from the dome portion 320 can be transmitted to the contact portion 271 of the circuit board 270 through the connecting terminal 324. In this case, the conductive contact points 322 and 323 and the support portion 324b may be connected together by a conductive pattern formed on the board.

The deformation portion 324a may extend from the first support portion to the second support portion to have a predetermined curvature. That is, the inner side of the deformation portion 324a that faces the dome portion 320 may be concave, and the outer side may be convex. The deformation portion 324a may be adapted in such a way that the upper and lower parts are symmetrical with respect to the center.

As such, the deformation portion 324a is elastically deformed in a direction toward or away from the dome portion 320 and supported by the support portion 324b so as to avoid deformation in an up-and-down direction. Therefore, the deformation portion 324a can make stable contact with the contact portion 271, even upon impact.

Referring to FIGS. 6a to 6c, the key module 300 includes a key body 310 and a dome portion 320. One surface (e.g., the front surface) of the key body 310 is exposed externally through the terminal body 204, and indicators such as symbols, characters, diagrams, etc. that indicate the functions of the key may be formed on the exposed surface. An actuator 314 may be formed on the other surface (e.g., rear surface) of the key body 310. The actuator 314 may be arranged to be in contact with the dome 321 formed at the dome portion 320.

A first dome contact point 322 and a second dome contact point 323 are formed on one surface of the dome portion 320, and when the dome 321 is pressed, the first dome contact point 322 and the second dome contact point 323 are electrically connected together by the dome 321. Through this electrical connection, a signal is generated. The generated signal is transmitted to the circuit board 270 through the connecting terminal 324.

A board of circuit board (PCB) type or flexible circuit board (FPCB) type may configure the body of the dome portion 320.

The connecting terminal 324 is formed integrally with the dome portion 320. In this case, part of the connecting terminal 324 has to be exposed to the rear surface of the dome portion 320 in order to be connected to the circuit board 270. As a way of forming the connecting terminal 324 integrally with the dome portion 320, the connecting terminal 324 may be inserted into the dome portion 320, or the connecting terminal 324 may be attached to the rear surface of the dome portion 320. As such, the exposed connecting terminal 324 and the circuit board 270 may be electrically connected together.

The connecting terminal 324 are elastically deformably formed and comes into elastic contact with the contact portion 271, though it may be made from various materials in various shapes.

As shown in FIG. 6b, the connecting terminal 324 may be made of a conductor, for example, whose upper and lower parts are symmetrical.

Back to describing the key module 300, the key module 300 has fixing portions 325 that extend in the length direction of the terminal body 304. In an example, the fixing portions 325 may be formed on the dome portion 320. Here, the fixing portions 325 are portions that protrude outward from both sides of the dome portion 320. The fixing portions 325 of the dome portion 320 that protrude longitudinally may be inserted into grooves 201d (see FIG. 7b) formed in the terminal body 204. By inserting the fixing portions 325 into the grooves 201d, the key module 300 may be fixed to the terminal body 204.

Preferably, the fixing portions 325 extend in the length direction of the terminal body 204. If the fixing portions 325 extend in the thickness direction of the terminal body 204, this becomes a factor that increases the thickness of the terminal body 204, posing an obstacle to slimming the terminal.

On the other hand, the fixing portions 325 may be formed not on the dome portion 320, but on the key body 310. In this case, only both side edges of the key module 300 are fixed to the terminal body 204, so that a key support portion 312 may be included in the key module 300 to keep the center area of the key module 300 from hanging down. In an example, a hard metal frame, as the key support portion 312, may be included in the key module 300.

Moreover, the key support portion 312 may be formed to support the key body 310, in order to keep the center area of the key body 310 from hanging down when pressed. In this case, the key support portion 3212 serves as a kind of support that supports the key body 210.

When the key body 310 is pressed, the actuator 314 formed on the rear surface of the key body 310 presses the dome 321 formed on one surface of the dome portion 320. When the key body 310 is not pressed, the rear surface of the key body 310 and one surface of the dome portion 320 must be separate from each other. To this end, a separation member 326 is formed on one surface of the dome portion 320. The separation member 326 protrudes toward the key body 310. In contrast, the separation member 326 may be formed on the rear surface of the key body 310 that faces the dome portion 320.

If the dome portion 320 and the key body 310 are formed integrally, one surface of the separation member 326 is attached to the key body 310. This attachment may be done with adhesive means such as double-sided tape or adhesive. Alternatively, the dome portion 320 and the key body 310 may be integrally fastened with a screw.

The aforementioned dome 321 and actuator 314 may be formed in plurality in number. The domes 321 and actuators 314 are configured to generate different signals. More specifically, one dome 321 and one actuator 314 generate one signal by input, and another dome 321 and another actuator 314 generate another signal by input. Therefore, a signal is generated from one dome 321 and one actuator 314 by input, and a different signal is generated from another dome 321 and another actuator 314 by input.

According to an embodiment, the key body 310 may include a plurality of elements. For example, the key body 310 may include a manipulating portion 311, a pressure portion 313, and a key support portion 312. One surface of the manipulating portion 311 is exposed externally through the terminal body 204, and indicators such as symbols, characters, diagrams, etc. that indicate the functions of the key may be formed on the exposed surface. The manipulating portion 311 may be made from soft synthetic resin in order to increase sensitivity to user touch.

One surface of the pressure portion 313 is attached to the manipulating portion 311, and the actuator 314 is formed on the other surface. A protruding projection 313a is formed on one surface of the pressure portion 313 which is to be attached to the manipulating portion 311, and the projection 313a may extend to penetrate through the key support portion 312 and be attached to the manipulating portion 311.

The key support portion 312 is formed to support the center area of the key module 300 in order to keep the center area of the key module 300 from hanging down. The key support portion 312 may be made of a hard frame having a predetermined rigidity.

In this manner, the manipulating portion 311, pressure portion 313, and key support portion 312 which constitute the key body 310 may be attached together and integrally formed. The integrally-formed key body 310 may be attached to the dome portion 320.

Figure 7B:
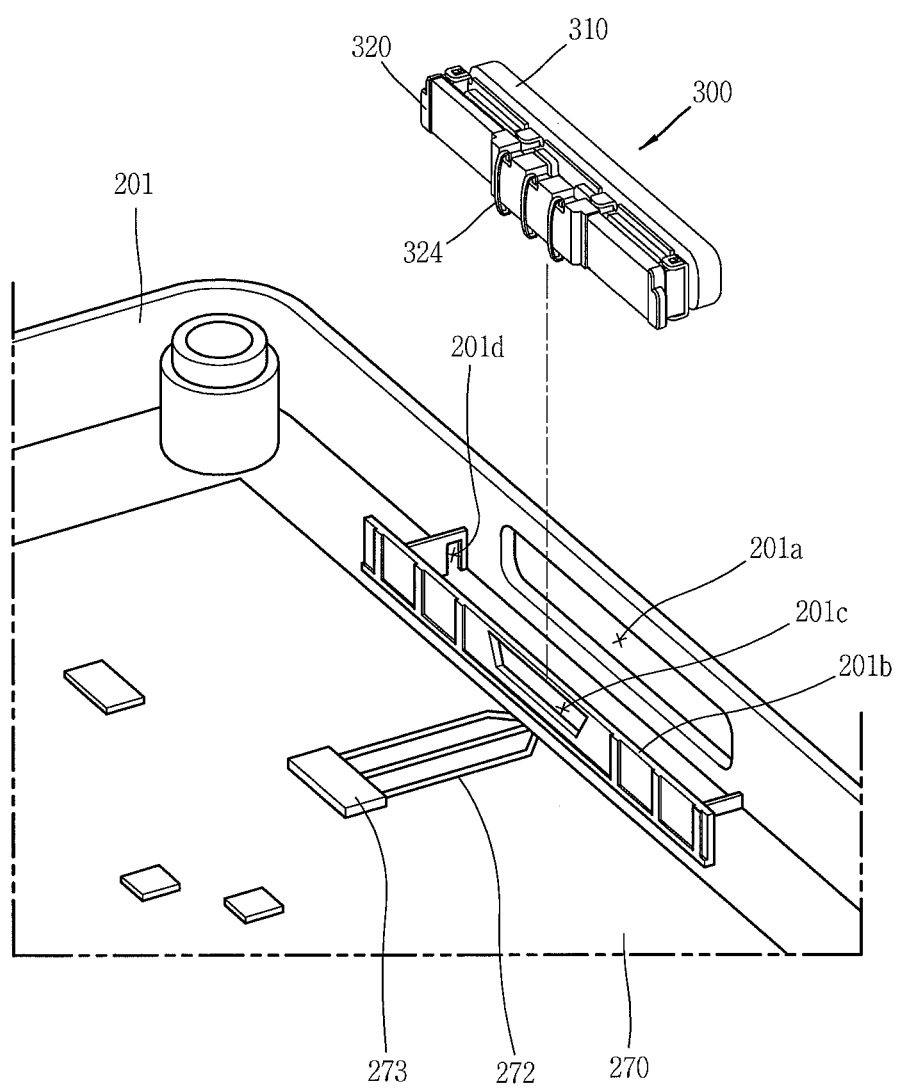
FIG. 7b is a view illustrating an example where the key module is mounted on the terminal body.

FIG. 7a illustrates an example where the key module of FIG. 6a is connected to the circuit board, and FIG. 7b is a view illustrating an example where the key module is mounted on the terminal body.

As shown in FIG. 7a, the key module 300 may be formed so that the key body 310 and the dome portion 320 are integral with each other. The connecting terminal 324 is exposed to the rear surface of the dome portion 320, and the exposed connecting terminal 324 is connected to the circuit board 270 so as to transmit signals to the circuit board 270. The contact portion 271 is arranged between the connecting terminal 324 and the circuit board 270. This allows signals from the key module 300 to be transmitted to the circuit board 270 through the connecting terminal 324 and the contact portion 271. The contact portion 271 may be attached to the circuit board 270, or printed in a conductive pattern on the circuit board 270. Alternatively, a conductive member may be attached to the circuit board 270 and then connected to the conductive pattern.

The connecting terminal 324 and the contact portion 271 may be provided in plural number.

Also, a key control portion 273, which is formed to process signals generated from the key module 300, and the contact portion 271 may be connected by a conductive line 272.

As shown in FIG. 7b, the key module 300 may be accommodated in an accommodating portion 201b formed in the terminal body 204. A via hole 201a is formed in the case 201 of the terminal body 204 so as to expose one surface of the key module 300, and one surface of the key module 300 is exposed through the via hole 201a when the key module 300 is accommodated in the accommodating portion 201b.

Moreover, the accommodating portion 201b guides the key module 300 so that the key module 300 is fixed to the terminal body 204. Also, the accommodating portion 201b may have a hole 201c through which the connecting terminal 324 can come into direct contact with the contact portion 271 of the circuit board 270. The connecting terminal 324 passes through the hole 201c and comes into direct contact with the contact portion 271.

On the other hand, the accommodating portion 201b may fix only some part of the key module 300 while guiding it, and the connecting terminal 324 and the contact portion 271 may be directly connected as the key module 300 and the circuit board 270 face each other.

The grooves 201d corresponding to the fixing portions 325 of the key module 300 is formed in the accommodating portion 201b. The fixing portions 325 are inserted and fixed into the grooves 201d.

In addition, a contact portion (not shown) interconnecting the circuit board 270 and the key module 300 may be formed in the accommodating portion 201b. In this case, the connecting terminal 324 may be connected to the contact portion of the accommodating portion 201b, and the conductive pattern formed on the circuit board 270 may be connected to the contact portion of the accommodating portion 201b.

Figure 8A:
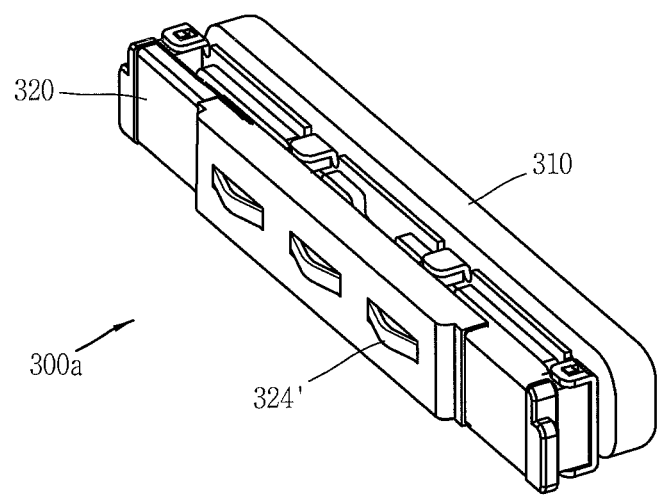
FIGS. 8a and 8b are conceptual diagrams illustrating a modified example of the connecting terminal formed on the rear surface of the dome portion.
Figure 8B:
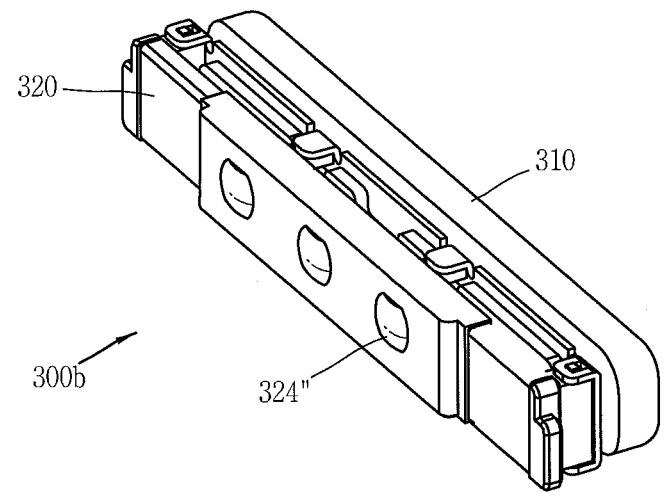

FIGS. 8a and 8b are conceptual diagrams illustrating a modified example of the connecting terminal formed on the rear surface of the dome portion.

As described above, the connecting terminal 324 is formed on the rear surface of the dome portion 320. The connecting terminal 324 is formed to transmit signals generated from the dome portion 320 to the circuit board 270. To this end, the connecting terminal 324 is positioned on the rear surface of the dome portion 320, and adapted to be in contact with the contact portion 271 of the circuit board 270. The connecting terminal 324 may be formed integrally with the dome portion 320.

As shown in the drawings, the connecting terminal 324 may be made from various elastically deformable materials in various shapes. In an example, as shown in FIG. 8a, the connecting terminal 324' may be made of a thin strip-shaped conductive member, and formed in such a way that the center area protrudes. The protruding center area is elastically deformed, and comes into contact with the contact portion 271 of the circuit board 270.

In another example, as shown in FIG. 8b, the connecting terminal 324" may be in the shape of a dome which is made of a conductive member. The center of the dome is elastically deformed, and comes into contact with the contact portion 271 of the circuit board 270.

The foregoing embodiments of the present invention do not limit the shape of the connecting terminal 324. However, the connecting terminal 324 may be formed in such a way as to be elastically deformed by applying pressure and bring some part into contact with the contact portion 271 of the circuit board 270.

Figure 9:
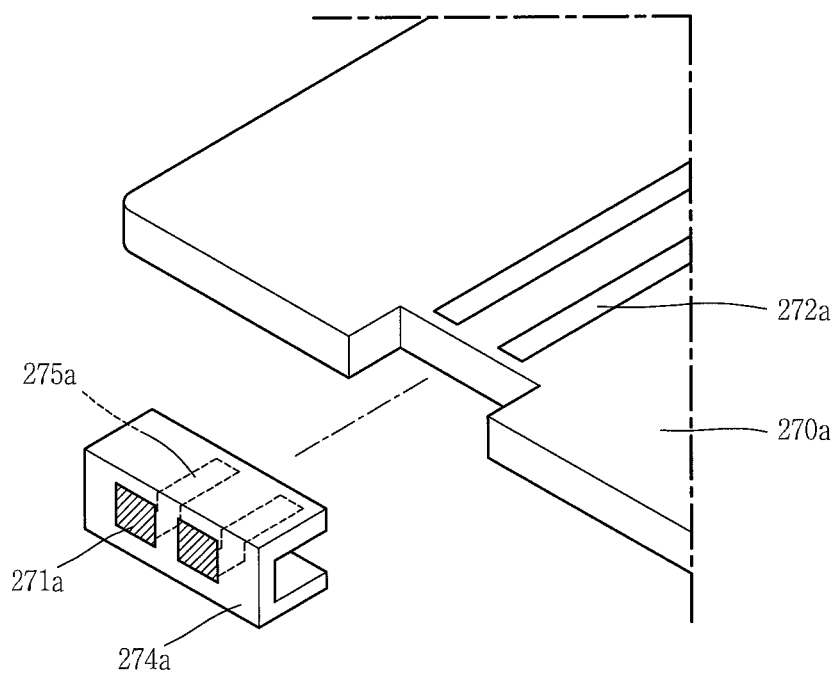
FIG. 9 is a conceptual diagram illustrating a modified example of contact portions formed on the circuit board.

FIG. 9 is a conceptual diagram illustrating a modified example of contact portions formed on the circuit board.

The contact portion 271 may be formed in a conductive pattern on the side of the circuit board 270 that faces the connecting terminal 324. However, if the circuit board 270 is thinned, it is difficult to form the contact portion 271 in a conductive pattern on the side of the circuit board 270.

Accordingly, as shown in FIG. 9, a contact portion 271a may be attached to the circuit board 270a after they are formed on a separate connecting portion 274a. If the contact portion 271a is formed on a separate connecting portion 274a, a conductive line 272a may be formed on one surface (the top, the bottom, or a side surface) of the circuit board 270a so that the circuit board 270a and the contact portion 271a are connected together. The connecting portion may have a conductive line 275a so that the contact portion 271a and the conductive line 272 are electrically connected together.

Figure 10A:
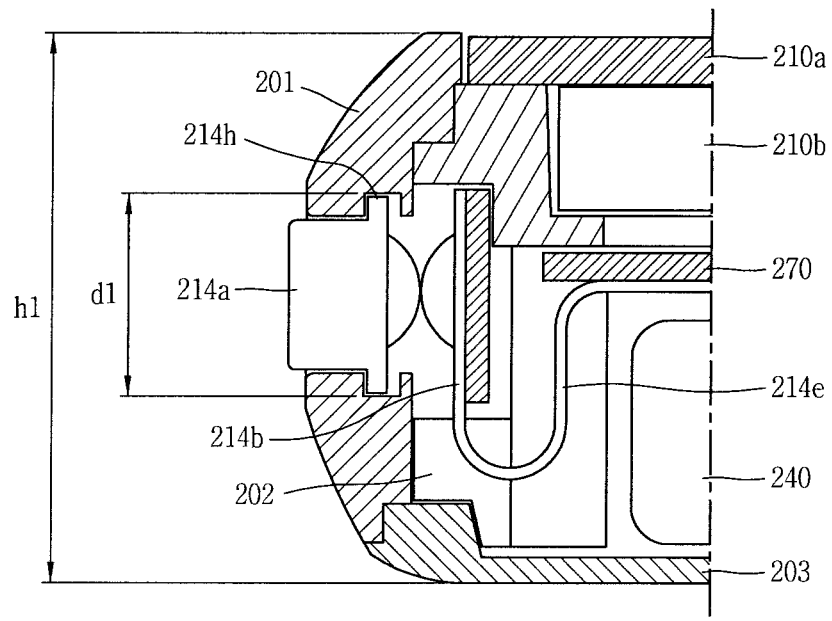
FIGS. 10a to 10c are cross-sectional views taken along line V-V of FIG. 2 according to comparative examples and an embodiment.
Figure 10B:
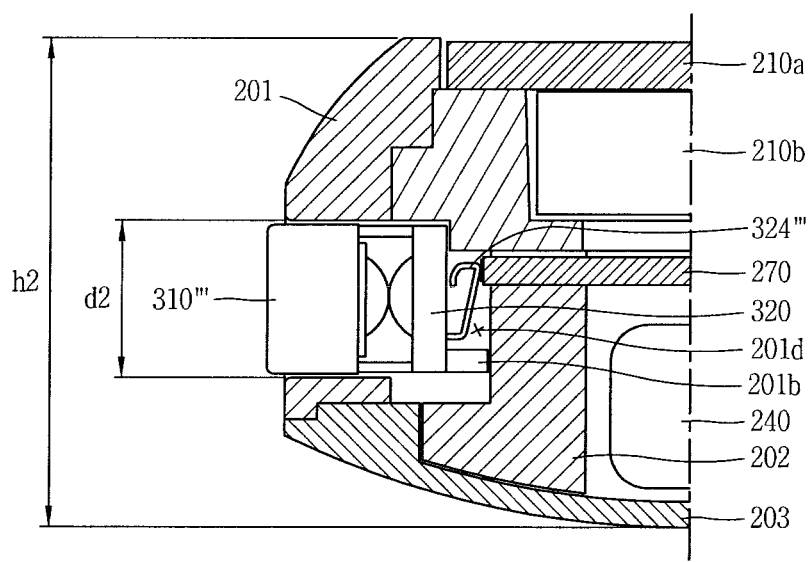
Figure 10C:
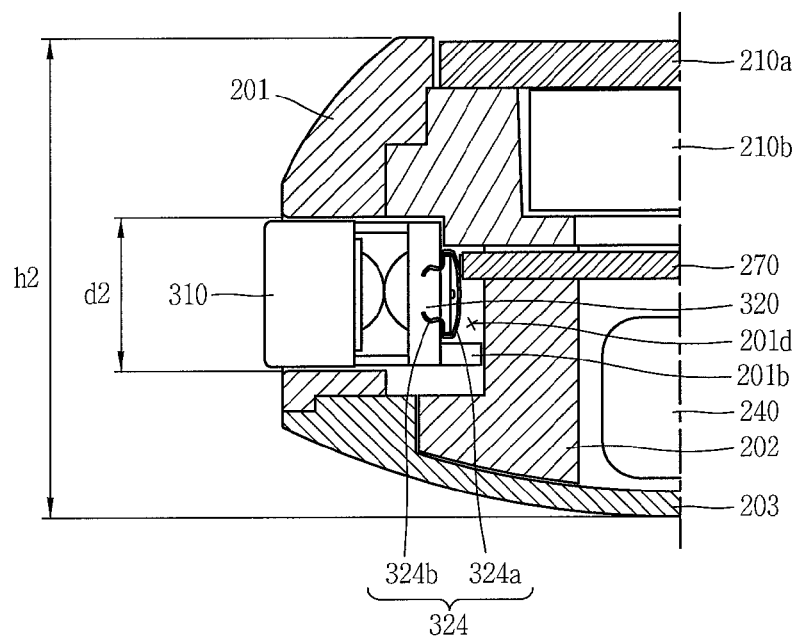
Figure 10D:
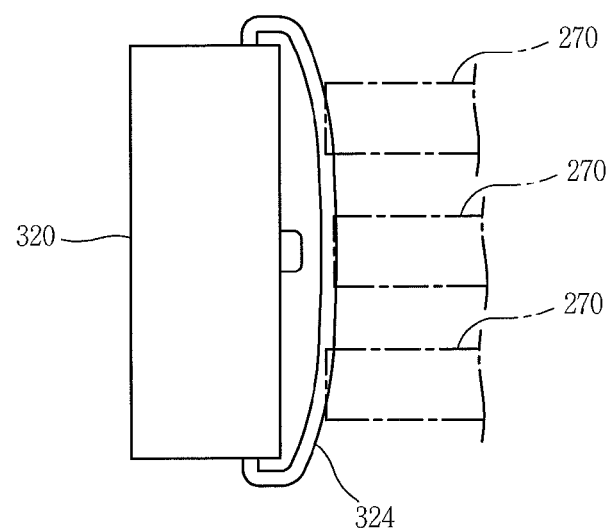
FIG. 10d is a view illustrating the connecting terminal and the circuit board being in contact with each other.

FIGS. 10a to 10c are cross-sectional views taken along line V-V of FIG. 2 according to comparative examples and an embodiment. FIG. 10d is a view illustrating the connecting terminal and the circuit board being in contact with each other.

According to the comparative example shown in FIG. 10a, the key body 214a constituting the key module 214 is attached to the case 201. Of the key body 214e, fixing portions that protrude upward and downward are attached to the case 201. Due to this, the size of the fixing portions 214h become a factor that increases the thickness dl of the key body 214h, and the key module 214 may cause an increase in the thickness h1 of the terminal. The dome portion 214b is attached and fixed to the structure within the terminal. Since the dome portion 214b and the circuit board 270 are connected by the flexible circuit board 214e, separate space is required to place the flexible circuit board 214e in it.

According to the embodiment of the present invention shown in FIG. 10c, the key module 300 is formed integrally and arranged in the accommodating portion 201b. The connecting terminal 324 penetrating through the via hole 201a of the accommodating portion 201b is attached to the contact portion 271 of the circuit board 270.

A comparison of the comparative example and the embodiment of the present invention will be made. According to the present invention, the fixing portions 325 of the key module 300 are formed in the length direction of the terminal. Accordingly, the terminal can be made slimmer. Moreover, as long as the key body 310 and the dome portion 320 are formed integrally and the key module 300 is assembled in the accommodating portion, the key module 300 and the circuit board 270 can be connected together, thus simplifying the assembly process. Also, the key module 300 and the circuit board 270 are interconnected not by the flexible circuit board but by the connecting terminal 324, and therefore space for the arrangement of the flexible circuit board is not required. As a result, the space within the terminal can be designed with more efficiency.

According to the comparative example shown in FIG. 10b, the connecting terminal 324''' may be made of a conductor that is bent in V or U-shape. The connecting terminal of this shape may be twisted or bent from impact, and this may release the connection between the connecting terminal 324''' and the contact portion of the circuit board 270. Moreover, the assembly direction may be limited in the process of attaching the key module to the terminal body. That is, although the connecting terminal can be assembled in such a way that it is pushed up, if the connecting terminal is assembled in such a way that it is pushed down, the connecting terminal and the circuit board may interfere with each other and therefore the assembly direction may be limited.

As shown in FIG. 6b and FIG. 10d, since the upper and lower parts of the connecting terminal 324 according to the present invention are symmetrical, the assembly direction is not limited. Moreover, the connecting terminal can be prevented from being twisted or bent upon impact, and can make stable contact with the contact portion 271.

Besides, as shown in FIG. 10b, the contact points and the connecting terminal can be electrically connected well even if the circuit board is not positioned at the center of the connecting terminal. That is, the contact state is maintained well even if the circuit board is brought into contact with the upper or lower part of the connecting terminal 324.

Figure 11A:
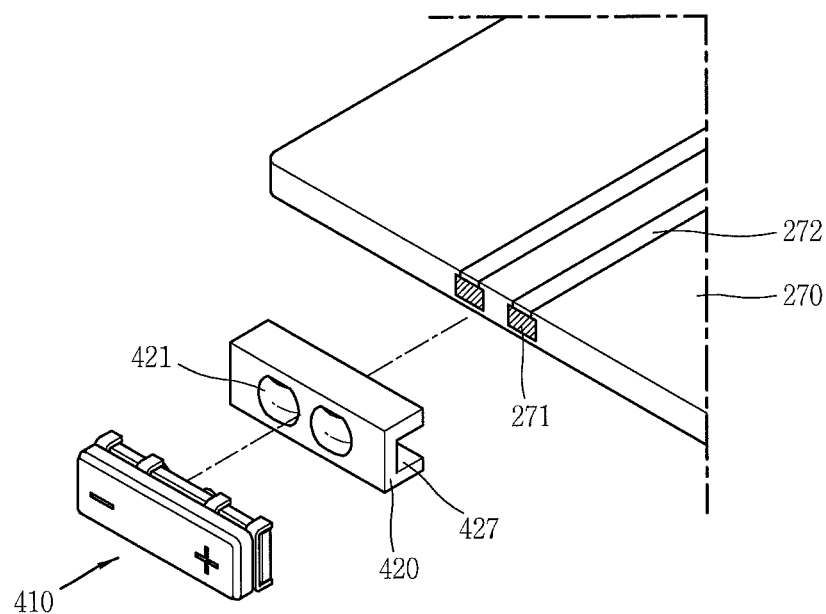
FIGS. 11a to 11c are conceptual diagrams illustrating examples of the dome portion attached to the circuit board according to another embodiment of the present invention.
Figure 11B:
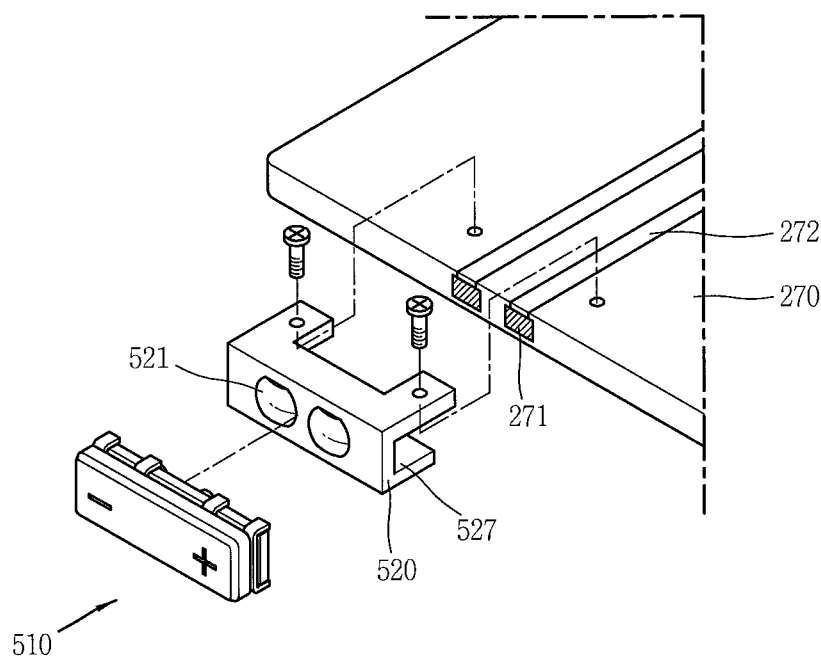
Figure 11C:
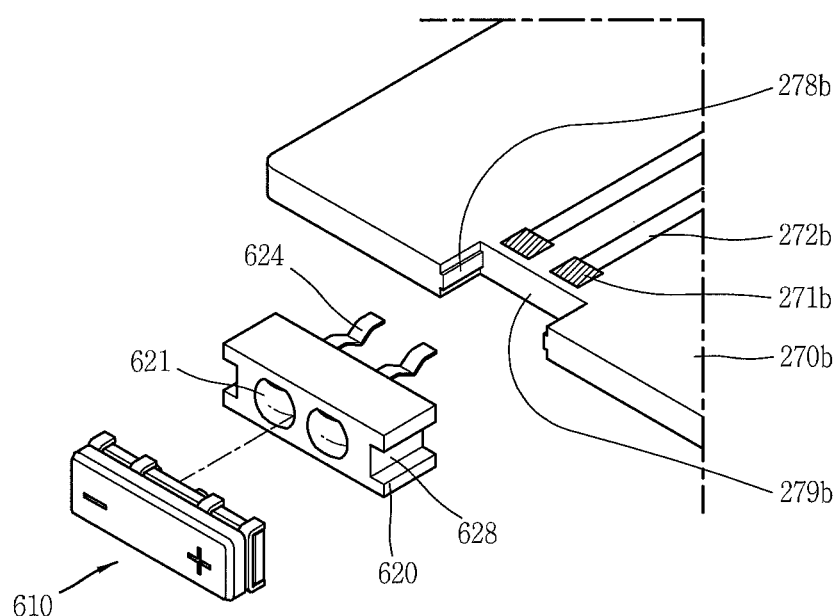

FIGS. 11a to 11c are conceptual diagrams illustrating examples of the dome portion attached to the circuit board according to another embodiment of the present invention.

According to the embodiment shown in the drawings, the dome portion 420, 520, and 620 is attached to the circuit board 270 and 270b, and the key body 410, 510, and 610 is separated from the dome portion 420, 520, and 620 and accommodated in the accommodating portion 201b of the terminal body 204. When the key body 410, 510, and 610 is separated from the dome portion 420, 520, and 620, the dome portion 420, 520, and 620 should have a given thickness so that it is pressed by the actuator 314 of the key body 410, 510, and 610. However, the circuit board 270 and 270b may not have sufficient thickness due to the trend toward a slimmer terminal body 204. Accordingly, the dome portion 420, 520, and 620 is manufactured with sufficient thickness, and the dome portion 420, 520, and 620 having a given thickness is attached to the circuit board 270 and 270b.

FIGS. 11a to 11c illustrate the shapes of the dome portion 420, 520, and 620 and examples where the dome portion 420, 520, and 620 is attached to the circuit board 270 and 270b.

As shown in FIGS. 11a and 11b, a dome 421 and 521 is formed on one surface of the dome portion 420 and 520, and may have an insert portion 427 and 527 which has a Π-shaped cross section by recessing part of the other surface (rear surface) inward. The circuit board 270 is inserted into the insert portion 427 and 527. A contact portion 271 may be formed on any one surface (e.g., the top, the bottom, or a side surface) of the inserted circuit board 270 so that it is connected to the connecting terminal of the dome portion 420 and 520.

In this case, the dome portion 520 may be fixed to the circuit board 270 by fastening means (e.g., a screw) that penetrates through the circuit board 270 and the dome portion 520.

Also, not shown, the dome portion may be fixed to the circuit board 270 by forming a via hole in the circuit board 270 and allowing part of the dome portion to penetrate through the via hole.

As shown in FIG. 11c, a dome 621 may be formed on one surface of the dome portion 620, and grooves 628 may be formed on the side of the dome portion 620. The circuit board 270b may include a recessed portion 279b that protrudes from the side and corresponds to the dome portion 620. As the dome portion 620 is inserted into the recessed portion 279b, the dome portion 620 may be attached to the circuit board 270b. Also, when mounting the dome portion 620 on the recessed portion 279b, some parts 278b of the circuit board 270b may be inserted into the grooves 628.

The connecting terminal 624 protrudes from the rear surface of the dome portion 620, and the connecting terminal 624 is brought into contact with the contact portion 271b formed on one surface of the circuit board 270b.

According to the embodiment shown in FIGS. 11a to 11c, a signal generated by the key module can be transmitted to the circuit board, without using the flexible circuit board, by attaching the dome portion and the circuit board together.

Figure 12A:
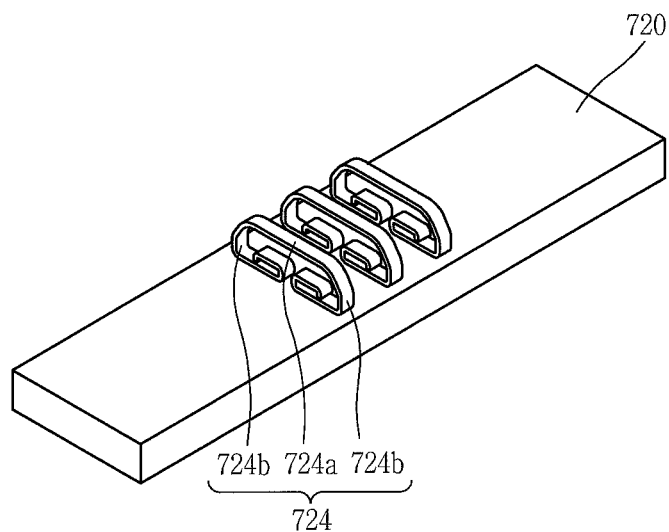
FIGS. 12a and 12b are a perspective view and a cross-sectional view illustrating a first example of a connecting terminal having an up-down symmetrical structure.
Figure 12B:
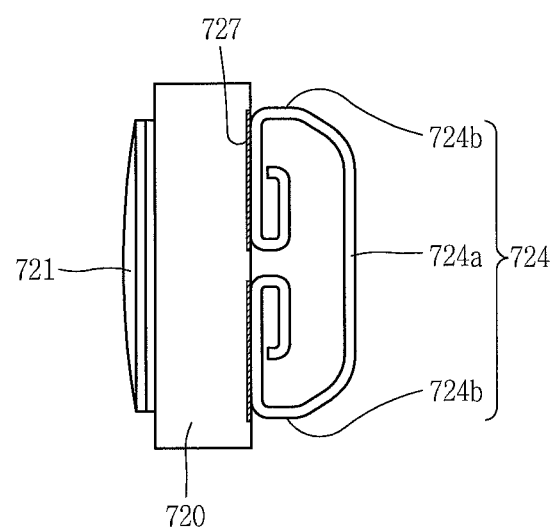
Figure 13A:
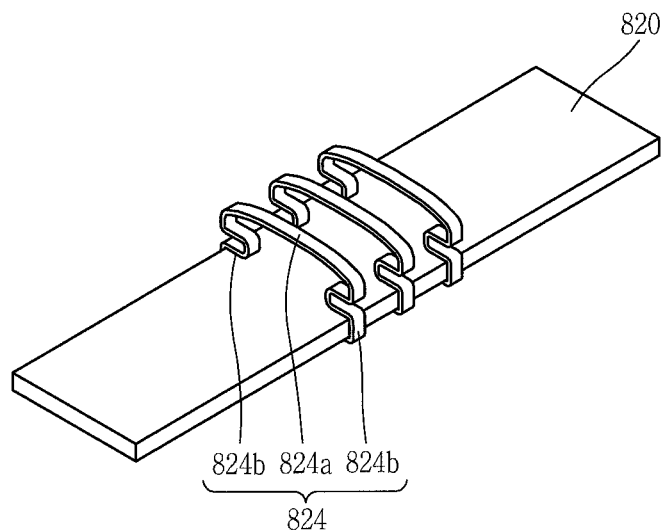
FIGS. 13a and 13b are a perspective view and a cross-sectional view illustrating a second example of a connecting terminal having an up-down symmetrical structure.
Figure 13B:
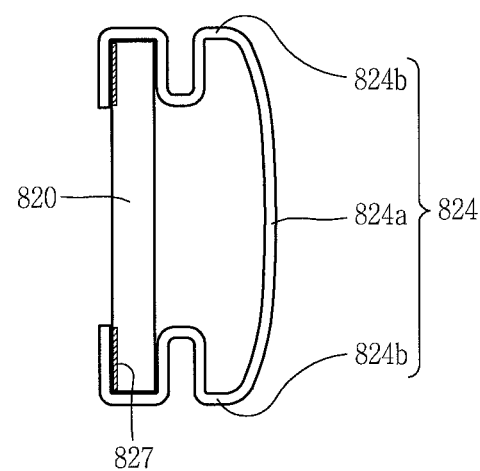
Figure 14A:
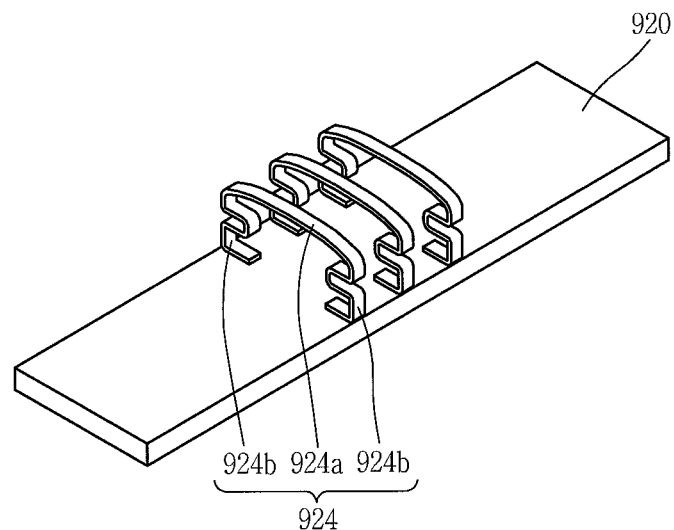
FIGS. 14a and 14b are a perspective view and a cross-sectional view illustrating a third example of a connecting terminal having an up-down symmetrical structure.
Figure 14B:
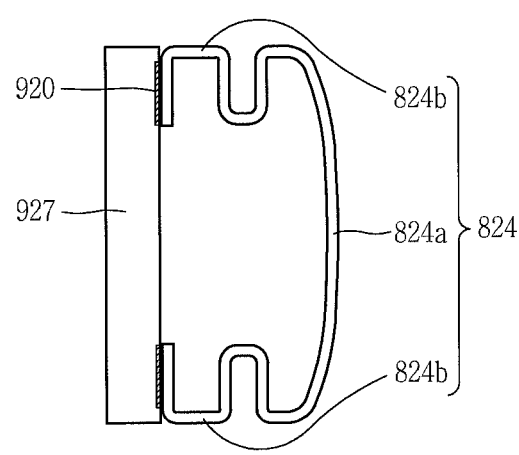

FIGS. 12a and 12b are a perspective view and a cross-sectional view illustrating a first example of a connecting terminal having an up-down symmetrical structure, FIGS. 13a and 13b are a perspective view and a cross-sectional view illustrating a second example of a connecting terminal having an up-down symmetrical structure, and FIGS. 14a and 14b are a perspective view and a cross-sectional view illustrating a third example of a connecting terminal having an up-down symmetrical structure.

Referring to FIGS. 12a and 12b, the upper and lower parts of the connecting terminal 724 are symmetrical with respect to the center. The connecting terminal 724 may include a deformation portion 724a and first and second support portions 724b. The deformation portion 724a may be elastically deformed in a direction toward or away from the dome portion 720. Therefore, the deformation portion 724a and the contact portion may maintain elastic contact with each other. The first and second support portions 724b may be formed on both sides of the deformation portion 724a. The first and second support portions 724b may elastically support the deformation portion 724a. The first and second support portions 724b may be fixed to the rear surface of the dome portion 720 by soldering. As such, only a conductive dome is formed on the front surface of the body, so that a water-resistant layer for covering the conductive dome to resist water can be formed more easily. That is, the dome portion 720 can be formed into a more simple shape, and this makes it easier to form a water-resistant layer on the front surface of the dome portion 720.

Also, any one of the support portions 724b may be electrically connected to conductive contact points formed on the dome portion 720, by which signals generated from the dome portion 720 can be transmitted to the contact portion of the circuit board through the connecting terminal 724. In this case, the conductive contact points and the support portion 724b may be connected together by a conductive pattern formed on the board.

Referring to FIGS. 13a and 13b, the upper and lower parts of the connecting terminal 824 are symmetrical with respect to the center. The connecting terminal 824 may include a deformation portion 824a and first and second support portions 824b. The deformation portion 824a may be elastically deformed in a direction toward or away from the dome portion 820. Therefore, the deformation portion 824a and the contact portion may maintain elastic contact with each other. The first and second support portions 824b may be formed on both sides of the deformation portion 824a. The first and second support portions 824b may elastically support the deformation portion 824a. The first and second support portions 824b may be attached to the body in such a way as to cover the sides in the thickness direction of the body. The body may have grooves into which the first and second support portions 824b can be inserted and fixed.

The first and second support portions 824b may be fixed to the body by soldering.

Also, any one of the support portions 824b may be electrically connected to conductive contact points formed on the dome portion 820, by which signals generated from the dome portion 820 can be transmitted to the contact portion of the circuit board through the connecting terminal 824. In this case, the conductive contact points and the support portion 824b may be connected together by a conductive pattern formed on the board.

Referring to FIGS. 14a and 14b, the upper and lower parts of the connecting terminal 924 are symmetrical with respect to the center. The connecting terminal 924 may include a deformation portion 924a and first and second support portions 924b. The deformation portion 924a may be elastically deformed in a direction toward or away from the dome portion 920. Therefore, the deformation portion 924a and the contact portion may maintain elastic contact with each other. The first and second support portions 924b may be formed on both sides of the deformation portion 924a. The first and second support portions 924b may elastically support the deformation portion 924a. The first and second support portions 924b may be fixed to the rear surface of the dome portion 920 by soldering. As such, only a conductive dome is formed on the front surface of the body, so that a water-resistant layer for covering the conductive dome to resist water can be formed more easily. That is, the dome portion 920 can be formed into a more simple shape, and this makes it easier to form a water-resistant layer on the front surface of the dome portion 920.

Also, any one of the support portions 924b may be electrically connected to conductive contact points formed on the dome portion 920, by which signals generated from the dome portion 920 can be transmitted to the contact portion of the circuit board through the connecting terminal 924. In this case, the conductive contact points and the support portion 924b may be connected together by a conductive pattern formed on the board.

Figure 15:
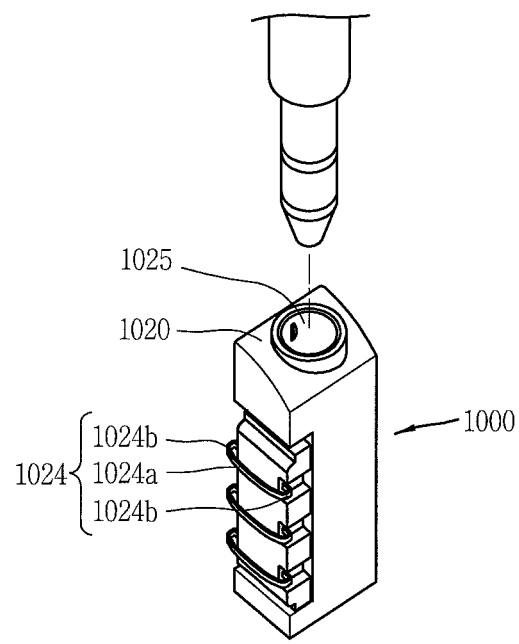
FIGS. 15 to 17 are conceptual diagrams illustrating examples of a connecting module having a connecting terminal according to embodiments of the present invention.
Figure 16:
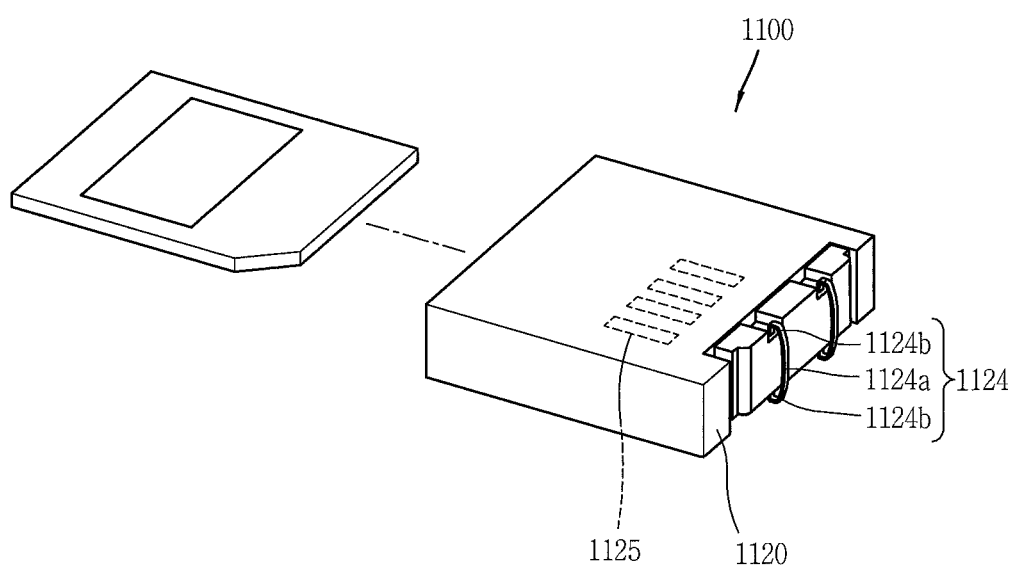
Figure 17:
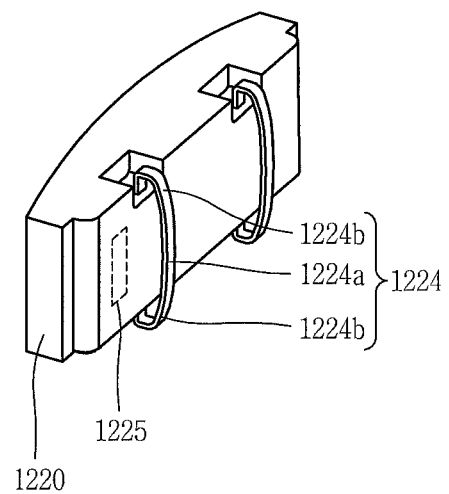

FIGS. 15 to 17 are conceptual diagrams illustrating examples of a connecting module having a connecting terminal according to embodiments of the present invention.

Connection modules are modules that electrically connect an external device to structures within a terminal. Examples of the connection modules may include an earjack for connecting an external sound output device, such as an earphone, to equipment inside a terminal, a socket for electrically connecting an external interface to internal equipment, or a power key.

The structures of the above-described body and connecting terminal may be implemented in connecting modules 1000, 1100, and 1200. That is, conductive contact points 1025, 1125, and 1225 that are electrically connected to external devices may be formed on one surface of the body 1020, 1120, and 1220, and a connecting terminal that is electrically connected to internal equipment may be formed on the other surface of the body.

The connecting terminal 1024, 1124, and 1224 may include a deformation portion 1024a, 1124a, and 1224a and first and second support portions 1024b, 1124b, and 1224b. The deformation portion may be elastically deformed in a direction toward or away from the body. Therefore, the deformation portion and the contact portion may maintain elastic contact with each other. The first and second support portions may be formed on both sides of the deformation portion. The first and second support portions may elastically support the deformation portion.

Any one of the first and second support portions may be electrically connected to the conductive contact points formed on the body, by which signals generated from external devices can be transmitted to internal devices through the connecting terminal, or signals from internal devices can be transmitted to external devices.

In a connecting module related to at least one of the embodiments of the present invention which have the above-described configurations, the upper and lower parts of the connecting terminal are symmetrical, and therefore the assembly direction is not limited. Also, the connecting terminal can be prevented from being twisted or bent upon impact, and can make stable contact with the contact portion.

Moreover, the simplified structure makes it easier to form a water-resistant layer on one surface of the connecting module.

In addition, the deformation portion is elastically deformed in a direction toward or away from the body and supported by the support portions so as to avoid deformation in an up-and-down direction. Therefore, the deformation portion can make stable contact with the contact portion, even upon impact.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A connecting module comprising:
   a body having conductive contact points formed on a surface of the body; and
   a connecting terminal exposed to a surface of the body, and the connecting terminal being electrically connected to the conductive contact points,
   the connecting terminal including:
      a deformation portion to elastically deform in a direction toward the body or away from the body; and
      a first support portion at a first end region of the deformation portion and a second support portion at a second end region of the deformation portion, wherein both the first support portion and the second support portion are inserted into the body such that the first and the second support portions are fixed into the body, and
      wherein the deformation portion is elastically supported by the first and second support portion that are fixed into the body such that the deformation portion has a curved shape from the first end region to the second end region.

2. The connecting module of claim 1, further comprising a board to be electrically connected to the conductive contact points.

3. The connecting module of claim 2, wherein the connecting terminal is to be electrically connected to the board.

4. A mobile terminal comprising:
   a terminal body; and
   a key module on the terminal body,
   the key module including:
      a key body;
      a dome portion to generate a signal based on an input to the key body; and
      a connecting terminal to attach to the dome portion,
      the connecting terminal including:
         a deformation portion to elastically deform in a direction toward the body or away from the key body; and
         a first support portion at a first end of the deformation portion and a second support portion at a second end of the deformation portion, wherein both the first support portion and the second support portion are inserted into the dome portion such that the first and the second support portions are fixed into the dome portion, and
         wherein the deformation portion is elastically supported by the first and second support portion that are fixed into the dome portion such that the deformation portion has a curved shape from the first end to the second end of the deformation portion.

5. The mobile terminal of claim 4, wherein the dome portion includes attaching portions that extend in a length direction of the terminal body, and the attaching portions are to be provided into grooves of the terminal body.

6. The mobile terminal of claim 4, wherein the connecting terminal is in contact with a contact portion of a circuit board that faces the connecting terminal so as to provide a signal to the circuit board in the terminal body.

7. The mobile terminal of claim 6, wherein the connecting terminal is a conductive terminal to elastically deform when in contact with the contact portion of the circuit board.

8. The mobile terminal of claim 6, wherein the contact portion is at an accommodating portion that supports the dome portion on a side of the terminal body.

9. The mobile terminal of claim 6, wherein the circuit board includes a recessed portion that is recessed inward from a side of the circuit board, and the dome portion is to be provided into the recessed portion.

10. The mobile terminal of claim 6, wherein the dome portion is attached to the circuit board by a fastening device that penetrates through the circuit board and the dome portion.

11. The mobile terminal of claim 6, wherein the dome portion includes an inwardly recessed insert portion, and the circuit board is provided to the insert portion.

12. The mobile terminal of claim 4, wherein an actuator is formed at a rear surface of the key body to contact a dome.

13. The mobile terminal of claim 4, wherein the key body includes:
   a manipulating portion to provide an outer appearance of the key body;
   a pressure portion attached to the manipulating portion, the pressure portion having an actuator, and the pressure portion being formed integrally with the dome portion; and
   a support portion to support the pressure portion.

14. The mobile terminal of claim 13, wherein the dome portion includes a separation member to protrude toward the pressure portion from a surface of the dome portion so as to separate a dome from the actuator by a predetermined gap.

* * * * *